3,787,478
NOVEL N-HALOALKYLATED ANILINES
Ladislav Dolejs, Pavel Beran, Karel Slama, and Frantisek Sorm, Prague, Czechoslovakia, assignors to Ceskoslovenska Akademie Ved, Prague, Czechoslovakia
No Drawing. Filed Apr. 21, 1971, Ser. No. 136,221
Claims priority, application Czechoslovakia, May 5, 1970, 3,122/70
Int. Cl. C07c *101/58*
U.S. Cl. 260—471 R            13 Claims

ABSTRACT OF THE DISCLOSURE

Novel N-haloalkylated anilines prepared by reaction of N-alkenyl anilines with hydrogen halide useful for the control of insects.

---

This invention relates to the novel compounds of Formula I:

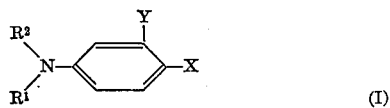

wherein,
X i

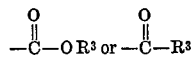

in which $R^3$ is hydrogen, lower alkyl, aryl or aralkyl;
Y is hydrogen, or together with X, forms the methylenedioxy bridge;
$R^1$ is one of the groups (A), (B) or (C):

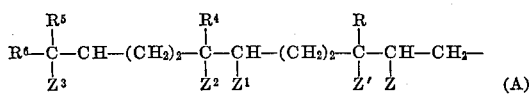

(A)

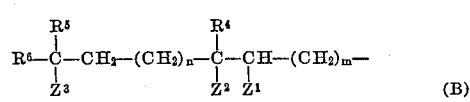

(B)

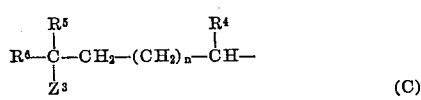

(C)

in which each of R, $R^4$, $R^5$ and $R^6$ is hydrogen or lower alkyl; Z is hydrogen and Z' is hydrogen, bromo, chloro, fluoro, or, together with Z, a carbon-carbon bond; $Z^1$ is hydrogen and $Z^2$ is hydrogen, bromo, chloro, fluoro, or together with $Z^1$, a carbon-carbon bond; $Z^3$ is bromo, chloro or fluoro;
$R^2$ is hydrogen, methyl, ethyl, propyl, n-butyl or one of the groups (A), (B) or (C);
$m$ is the positive integer one or two; and
$n$ is the positive integer two or three.

The term "aryl," as used herein, refers to an aryl group of six to twelve carbon atoms, such as phenyl, naphthyl and methylphenyl.

The term "lower alkyl," as used herein, refers to an alkyl group, straight or branched, having a chain length of one to six carbon atoms. The term "aralkyl," as used herein, refers to aralkyl of seven to twelve carbon atoms, such as benzyl, phenethyl, methylbenzyl and naphthylmethyl.

The novel compounds of Formula I are useful for the control of insects. The utility of these compounds as insect control agents is believed to be attributable to their juvenile hormone activity. They are preferably applied to the immature insect, namely—during the embryo, larvae or pupae state in view of their ability to inhibit metamorphosis and otherwise cause abnormal development. These compounds are effective control agents for Hemipteran, such as Lygaeidae, Miridae and Pyrrhocoridae; Coleopteran; Lepidopteran, such as Pyralidae, Noctiidae and Gelechiidae; Dipteran, such as mosquitoes; Orthoptera, such as roaches; and Homoptera, such as aphids. The compounds can be applied at low dosage levels of the order of 0.001 µg. to 25 µg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 50% of the active compound is employed. The formulation can include insect attractants, emulsifying agents and wetting agents to assist in the application and efficiency of the active ingredient.

In the description following, each of X, Y, R to $R^6$, Z to $Z^3$, $m$ and $n$ are as defined above unless otherwise indicated.

The compounds of Formula I are prepared by treatment of the corresponding unsaturated aniline (II) with hydrogen halide in an organic solvent such as an ether, alcohol, carbon tetrachloride, and the like (the broken line in Formula II indicate the presence or absence of a carbon-carbon bond.)

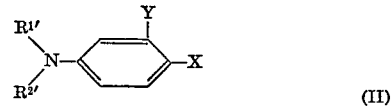

(II)

wherein $R^{1'}$ is one of the groups A', B' or C' and $R^{2'}$ is hydrogen, methyl, ethyl, propyl, n-butyl or one of the groups (A'), (B') or (C'):

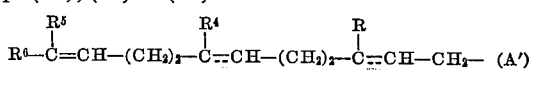 (A')

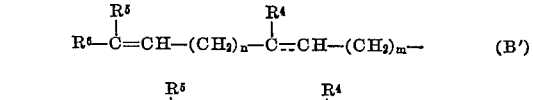 (B')

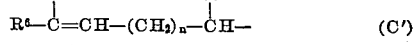 (C')

The precursors Formula II can be prepared as described in application Ser. No. 98,093, filed Dec. 14, 1970, the disclosure of which is incorporated by reference.

The following examples are provided to illustrate the present invention.

EXAMPLE 1

Ethyl N,N-bis-(7-chloro-3,7-dimethyl - 2 - octenyl)-p-aminobenzoate. — Ethyl N,N-digeranyl-p-aminobenzoate is dissolved in an anhydrous solvent (ether, alcohol) and the solution is saturated with dry gaseous hydrogen chloride. The reaction mixture is allowed to stand at ordinary temperature for one hour, the solvent is evaporated under diminished pressure at a lower temperature, and the residue is shaken with a mixture of ether and aqueous sodium hydrogen carbonate. The ethereal layer is washed with water and dried over sodium sulfate. The yield is quantitative, the product contains only traces of the starting material which may be removed by chromatography on a layer of silica gel. Mass spectrum: The molecular ion shows a negligible intensity (M 509 for $C_{29}H_{45}NO_2{}^{35}Cl_2$); characteristic ions M—HCl, M—2HCl, m/e 368, 301, 178, 165, 120.

EXAMPLE 2

Ethyl N-(7-fluoro-3,7-dimethyl-2-octenyl) - p - aminobenzoate.—A solution of N-geranyl-p-aminobenzoic acid ethyl ester in a dry solvent (e.g., in ether or alcohol) is placed into a poly (ethylene) vessel and treated under cooling with excess liquid hydrogen fluoride. The reaction mixture is allowed to stand in an ice-box for 2 days and then cautiously neutralized under cooling with dilute alkali hydroxide. The mixture is thoroughly shaken, the organic layer is separated, dried, and the solvent is evaporated. The residue is chromatographed on a column of silica gel. Mass spectrum: Characteristic peaks at 321, 301, 178, 165, and 150.

EXAMPLE 3

Each of the unsaturated compounds under column (I) is used as the starting material in the process of Example 1 to prepare the respective chloride under column (II).

(I)

ethyl N-3,7-dimethyloct-6-enyl-p-aminobenzoate
ethyl N-1,5-dimethylhex-4-enyl-p-aminobenzoate
ethyl N-3,7-dimethylnona-2,6-dienyl-p-aminobenzoate
ethyl N-3-ethyl-7-methylnona-2,6-dienyl-p-aminobenzoate
ethyl N-4,8-dimethylnona-3,7-dienyl-p-aminobenzoate
methyl N-3,7-dimethylocta-2,6-dienyl p-aminophenylketone
methyl N-3,7-dimethyloct-6-enyl p-aminophenylketone
N-3,7-dimethylocta-2,6-dienyl 3,4-methylenedioxyaniline
N-3,7-dimethyloct-6-enyl 3,4-methylenedioxyaniline
N-1,5-dimethylhex-4-enyl 3,4-methylenedioxyaniline
N-3,7-dimethylnona-2,6-dienyl 3,4-methylenedioxyaniline
N-3-ethyl-7-methylnona-2,6-dienyl 3,4-methylenedioxyaniline
N-4,8-dimethylnona-3,7-dienyl 3,4-methylenedioxyaniline
ethyl N-3,7-dimethylocta-2,6-dienyl p-aminophenylketone
ethyl N-3,7-dimethyloct-6-enyl p-aminophenylketone (II)

ethyl N-7-7-chloro-3,7-dimethyloctyl p-aminobenzoate
ethyl N-5-chloro-1,5-dimethylhexyl p-aminobenzoate
ethyl N-7-chloro-3,7-dimethylnon-2-enyl p-aminobenzoate
ethyl N-7-chloro-3-ethyl-7-methylnon-2-enyl p-aminobenzoate
ethyl N-8-chloro-4,8-dimethylnon-3-enyl p-aminobenzoate
methyl N-7-chloro-3,7-dimethyloct-2-enyl p-aminophenylketone
methyl N-7-chloro-3,7-dimethyloctyl p-aminophenylketone
N-7-chloro-3,7-dimethyloct-2-enyl 3,4-methylenedioxyaniline
N-7-chloro-3,7-dimethyloctyl 3,4-methylenedioxyaniline
N-5-chloro-1,5-dimethylhexyl 3,4-methylenedioxyaniline
N-7-chloro-3,7-dimethylnon-2-enyl 3,4-methylenedioxyaniline
N-7-chloro-3-ethyl-7-methylnon-2-enyl 3,4-methylenedioxyaniline
N-8-chloro-4,8-dimethylnon-3-enyl 3,4-methylenedioxyaniline
ethyl N-7-chloro-3,7-dimethyloct-2-enyl p-aminophenylketone

EXAMPLE 4

Anhydrous hydrogen chloride is introduced into 100 ml. of ether at 0° C. until a saturated solution is obtained. One gram of ethyl N-3,7-dimethylocta-2,6-dienyl p-aminobenzoate is added to stand at 0° C. for four days. The mixture is then evaporated under reduced pressure to yield N-3,7-dichloro - 3,7 - dimethyloctyl p-aminobenzoate which can be purified by chromatography.

ACTIVITY TESTS

The test substances were applied externally to freshly molted last larval instars or freshly molted pupae in a constant 1 microliter drop of an acetone solution. In injection assays, the test substances were injected into the same developmental states in 1 microliter of olive oil. In sterilization assays on females, the test substances were applied externally in 1 microliter of acetone to two days old females.

Evaluation of activity: The juvenile hormone activity was evaluated from the degree of morphological change induced, after the subsequent molting. The effects are expressed in ID–50 activity units (half inhibition of metamorphosis) indicating that amount of the substance in micrograms, which under the above mentioned conditions caused formation of half-larval, half-imaginal adultoids (with Hemiptera) and half-pupal, half-imaginal adultoids (with beetles). These adultoids are completely incapable of a further development and die. Even lower does than ID–50 values may lead to death of the population. The sterilization activity was evaluated on the basis of effects on the embryonic development and hatching ability of eggs.

Table I shows the juvenile hormone activity on some insect species possessing both the complete and incomplete metamorphosis. The ID–50 data are expressed in micrograms per specimen.

It may be seen from the table that the test substances display a considerably high activity; in some cases, this activity is about a thousand times higher than with classical insecticides. Furthermore, the test substances are very active when applied topically. The test substances belong to the group of selective pesticides since some of them are active only on some insect species and are inactive on the other one. This is a great advantage in comparison with classical insecticides which kill insects without any exception.

The test substances may be used as insect pesticides of the new generation, cf. C. M. Williams: Sci. Amer. 217, 13 (1967). They can be applied in field conditions in the form of a spray, dusting, or aerosol. They may be used to contaminate insect localities and insect food. The effect of the test substances consists in the formation of deformed specimens incapable of a further development or in the sterility of eggs.

TABLE I

| | Pyrrhocoridae | | Pentatomidae: Graphosoma italicum, topical | Tenebrionidae: Tenebrio molitor | |
|---|---|---|---|---|---|
| | Pyrrhocoris apterus, topical | Dysdercus cingulatus, topical | | Top. | Inj. |
| I | 0.005 | 0.005 | 1 | 1,000 | 1,000 |
| II | 0.0005 | 0.0005 | 100 | 1,000 | 1,000 |
| III | 0.1 | 0.07 | 20 | 100 | 100 |
| IV | 0.7 | | 1 | | 1 |
| V | 0.4 | 0.5 | 1,000 | | 1,000 |
| VI | 0.008 | 0.006 | | | 1,000 |

NOTE:
I = Ethyl N-7-chloro-3,7-dimethyloct-2-enyl p-aminobenzoate.
II = Ethyl N,N-bis-7-chloro-3,7-dimethyloct-2-enyl p-aminobenzoate.
III = Methyl N-7-chloro-3,7-dimethyloctyl p-aminobenzoate.
IV = N-7-chloro-3,7-dimethyloct-2-enyl 3,4-methylenedioxyaniline.
V = Ethyl N-7-fluoro-3,7-dimethyloct-2-enyl p-aminobenzoate.
VI = N-7,11-dichloro-3,7,11-trimethyldodec-2-enyl 3,4-methylenedioxyaniline.

Compounds I and II when applied to adult females of Pyrrhocoris (0.1–1.0 microgram per specimen) caused more than 50% permanent sterility of eggs; consequently, they belong to the best ovicides known.

What is claimed is:

1. A compound selected from those of the following formula

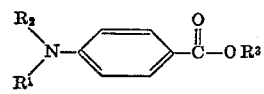

wherein,
R³ is hydrogen or lower alkyl;
R¹ is one of the groups (B) or (C);

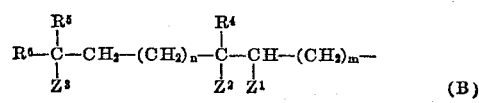

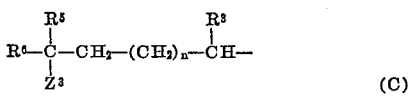

(C)

in which each of $R^4$, $R^5$, and $R^6$ is hydrogen or lower alkyl; $Z^1$ is hydrogen and $Z^2$ is hydrogen, bromo, chloro, fluoro, or together with $Z^1$, a carbon-carbon bond; $Z^3$ is bromo, chloro or fluoro;

$R^2$ is hydrogen, methyl, ethyl, propyl, n-butyl or one of the groups (B) or (C);

$m$ is the positive integer one or two; and $n$ is the positive integer two or three.

2. A compound according to claim 1 wherein $R^1$ is the group:

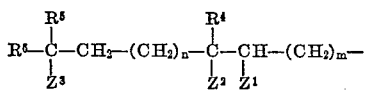

3. A compound according to claim 2 wherein $m$ is one and $n$ is two.

4. A compound according to claim 3 wherein $R^3$ is methyl or ethyl; each of $R^4$, $R^5$, and $R^6$ is methyl or ethyl and $R^2$ is hydrogen.

5. A compound according to claim 4 wherein $R^4$ is methyl; $Z^3$ is chloro; and each of $Z^2$ and $Z^1$ is hydrogen or together form a carbon-carbon bond.

6. A compound according to claim 5 wherein $R^5$ is methyl.

7. A compound according to claim 5 wherein each of $R^5$ and $R^6$ is methyl.

8. A compound according to claim 3 wherein $R^3$ is methyl or ethyl; each of $R^4$, $R^5$, and $R^6$ is methyl or ethyl and $R^2$ is the same as $R^1$.

9. A compound according to claim 8 wherein $R^4$ is methyl; $Z^3$ is chloro; and each of $Z^2$ and $Z^1$ is hydrogen or together form a carbon-carbon bond.

10. A compound according to claim 9 wherein $R^5$ is methyl.

11. A compound according to claim 9 wherein each of $R^5$ and $R^6$ is methyl.

12. A compound according to claim 1 selected from the following formula:

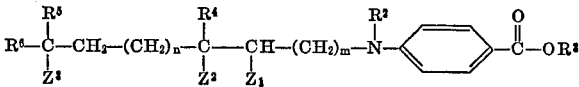

wherein, $R^3$ is hydrogen or lower alkyl;

$R^2$ is hydrogen, methyl, ethyl, propyl, n-butyl, or a group of the formula:

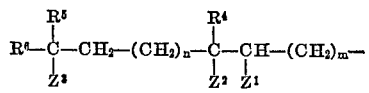

and each of $R^4$, $R^5$, and $R^6$ is hydrogen or lower alkyl; $Z^1$ is hydrogen and $Z^2$ is hydrogen, bromo, chloro, fluoro or together with $Z^1$, a carbon-carbon bond; $Z^3$ is bromo, chloro or fluoro; $m$ is a positive integer 1 or 2 and $n$ is a positive integer 2 or 3.

13. The compound according to claim 1 which is ethyl N-7-chloro-3,7-dimethyloct-2-enyl p-aminobenzoate.

References Cited
UNITED STATES PATENTS 3,485,865   12/1969   Richter _____ 260—518 R X ALEX MAZEL, Primary Examiner J. H. TURNIPSEED, Assistant Examiner U.S. Cl. X.R.

260—340.5, 518 A, 518 R, 570, 576; 424—282